(12) United States Patent
Bhullar et al.

(10) Patent No.: US 12,271,573 B2
(45) Date of Patent: Apr. 8, 2025

(54) AUTO-FLOWCHART GENERATOR

(71) Applicant: Apple Inc., Cupertino, CA (US)

(72) Inventors: Bicrumjit S Bhullar, San Jose, CA (US); Timothy M Oxenford, Vancouver (CA); Emily L Pepke, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/315,189

(22) Filed: May 10, 2023

(65) Prior Publication Data

US 2024/0377921 A1 Nov. 14, 2024

(51) Int. Cl.
| | |
|---|---|
| G06F 3/0482 | (2013.01) |
| G06F 3/04817 | (2022.01) |
| G06F 3/0484 | (2022.01) |
| G06F 3/04842 | (2022.01) |
| G06F 3/04845 | (2022.01) |
| G06F 3/0485 | (2022.01) |
| G06F 3/0486 | (2013.01) |
| G06F 40/103 | (2020.01) |
| G06F 40/166 | (2020.01) |
| G06Q 10/06 | (2023.01) |
| G06T 11/20 | (2006.01) |

(52) U.S. Cl.
CPC ........ *G06F 3/0482* (2013.01); *G06F 3/04817* (2013.01); *G06F 3/0484* (2013.01); *G06F 3/04842* (2013.01); *G06F 3/0486* (2013.01); *G06F 40/103* (2020.01); *G06F 40/166* (2020.01); *G06Q 10/06* (2013.01); *G06T 11/206* (2013.01); *G06F 3/04845* (2013.01); *G06F 3/0485* (2013.01)

(58) Field of Classification Search
CPC .. G06F 3/0482; G06F 3/04817; G06F 3/0484; G06F 3/04842; G06F 3/0486; G06F 40/103; G06F 40/166; G06Q 10/06; G06T 11/206
See application file for complete search history.

(56) References Cited

U.S. PATENT DOCUMENTS

| | | | | |
|---|---|---|---|---|
| 2008/0313565 A1* | 12/2008 | Albertson | ............. | G06T 11/206 715/825 |
| 2009/0199123 A1* | 8/2009 | Albertson | ........... | G06F 3/04845 715/772 |
| 2012/0081389 A1* | 4/2012 | Dilts | ................... | G06F 16/9558 345/619 |
| 2012/0293558 A1* | 11/2012 | Dilts | ................... | G06F 3/04845 345/676 |
| 2013/0278638 A1* | 10/2013 | Yoshikawa | ............... | G06F 8/10 345/681 |
| 2013/0335339 A1* | 12/2013 | Maunder | ............. | G06F 3/04817 345/173 |
| 2014/0222181 A1* | 8/2014 | Hemenway | ......... | G06F 3/04817 700/97 |

(Continued)

*Primary Examiner* — Asher D Kells
(74) *Attorney, Agent, or Firm* — FLETCHER YODER PC

(57) ABSTRACT

Systems and techniques are provided herein to facilitate efficient and productive online collaboration. In particular, a collaborator follow function provides the ability of one view of a collaborative environment to mimic another collaborator's view. In this manner, collaborators may be apprised of collaboration contributions in wholly different areas of a collaborative environment than they are currently in.

20 Claims, 10 Drawing Sheets

(56) References Cited

U.S. PATENT DOCUMENTS

2017/0141976 A1\* 5/2017 Morgan ................ G06T 11/206
2019/0182131 A1\* 6/2019 Morgan ................ H04L 43/045
2020/0293171 A1\* 9/2020 Draper ................ G06F 3/04847

\* cited by examiner

AUTO-FLOWCHART GENERATOR

BACKGROUND

The present disclosure relates generally to productivity tools, and more specifically to a system and method for facilitating collaborative work and communication among remote users over the internet.

In today's fast-paced business environment, organizations often rely on productivity application to draft flowcharts. Unfortunately, however, there has been little innovation in the area of flowchart drafting and the flowchart generation process using traditional tools is quite tedious and time consuming.

Therefore, there is a need for improved systems and methods for automated flowchart tools that can increase efficiencies and reduce erroneous inconsistencies.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure addresses the shortcomings of prior art by providing a comprehensive system and method for online collaboration that integrates various features into a unified platform, enhances user experience, and leverages technologies to facilitate remote team communication and coordination. The system includes a user-friendly interface that aims to revolutionize online collaboration, making it more efficient and enjoyable for remote teams, and thereby enhancing productivity and innovation in various fields. Specifically, a follow function allows collaborators to quickly and effortlessly follow the actions of other collaborators within the collaborative environment by adjusting the follower's view to mimic the followed collaborator's view. The collaborator following techniques described herein may be applied in any remote collaboration environment where disparately placed client electronic devices are able to access and/modify portions of a collaboration document. For example, collaboration environments may include any collaborative productivity environment, such as a collaborative productivity application that provides a flexible collaboration canvas enabling remote users to utilize a shared space for increased collaboration. Other collaboration environments may include collaborative spreadsheet environments, collaborative word processing environments, collaborative electronic slide presentation environments, etc.

While the follow collaborator techniques may be applied to numerous collaborative environment, these techniques may be especially beneficial in "infinite" collaborative environments, where borders of the collaborative environment are expanded as they are encroached upon. Indeed, in these expansive collaboration environments it may be quite difficult to understand collaborative contributions being provided by other collaborators in other areas of the collaborative environment.

In one embodiment, a tangible, non-transitory, computer-readable medium, comprising computer-readable instructions that when executed by one or more processors of one or more computers, cause the one or more computers to: present a graphical user interface (GUI) comprising a work canvas and a first object; receive an indication to extend a flow connection from the first object to a second object, independent of selection via a connection insertion tool of the GUI; and in response to receiving the indication, generate, in the GUI, the flow connection between the first object and the second object.

In another embodiment, a computer-implemented method, includes: presenting a graphical user interface (GUI) comprising a work canvas and a first object; rendering, in the GUI, a flow connection node associated with the first object, wherein an interaction with the flow connection node via the GUI is configured to provide an indication to extend a flow connection from the first object; receiving an interaction input indicating a movement of the flow connection node from the first object to a second object; and in response to receiving the interaction input, generating, in the GUI, a flow connection between the first object and the second object, independent of selection of a connection insertion tool of the GUI.

In yet another embodiment, a system, includes: memory; and one or more processors configured to host a cloud-based productivity application, the cloud-based productivity application configured to: cause presentation, at a client computer, a graphical user interface (GUI) comprising a work canvas and a first object; receive, via the client computer, an indication to extend a flow connection from the first object to a second object independent of selection via a connection insertion tool of the GUI; and in response to receiving the indication, cause generation, in the GUI, the flow connection between the first object and the second object.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to facilitating efficient flowchart generation in productivity applications. Many productivity applications are used to generate flowcharts. However, these productivity tools have not provided sufficient tools to generate flowcharts in a time-efficient and consistent manner. Indeed, these applications have typically relied on generic shape and connector insertion tools that are inefficient and oftentimes provide inconsistencies across inserted objects and connections.

Embodiments discussed herein provide various apparatuses and techniques to enable increased efficiency and consistency in flowchart generation. Specifically, systems and techniques are provided that enable, in certain embodiments, automatic flowchart object insertion, efficient flowchart object connection, and/or automatic flowchart object and/or connector formatting.

Figure 1:
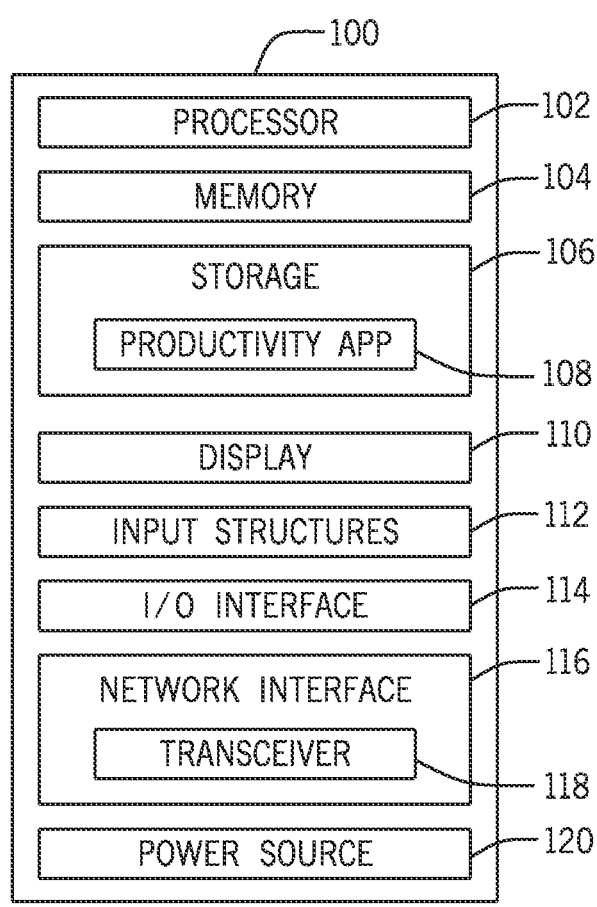
FIG. 1 is a block diagram of an electronic device that provides contributor following functions in a collaborative environment of a productivity application, in accordance with one or more embodiments of the current application.

FIG. 1 is a block diagram of an electronic device 100, according to embodiments of the present disclosure. The electronic device 100 may include, among other things, one or more processors 102 (collectively referred to herein as a single processor for convenience, which may be implemented in any suitable form of processing circuitry), memory 104, nonvolatile storage 106, a display 108, input structures 112, an input/output (I/O) interface 114, a network interface 116, and a power source 118. The various functional blocks shown in FIG. 1 may include hardware elements (including circuitry), software elements (including machine-executable instructions) or a combination of both hardware and software elements (which may be referred to as logic). The processor 102, memory 104, the nonvolatile storage 106, the display 108, the input structures 112, the input/output (I/O) interface 114, the network interface 116, and/or the power source 118 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 100.

By way of example, the electronic device 100 may include any suitable computing device, including a desktop or notebook computer, a portable electronic or handheld electronic device such as a wireless electronic device or smartphone, a tablet, a wearable electronic device, and other similar devices. In additional or alternative embodiments, the electronic device 100 may include an access point, such as a base station, a router (e.g., a wireless or Wi-Fi router), a hub, a switch, and so on. It should be noted that the processor 102 and other related items in FIG. 1 may be embodied wholly or in part as software, hardware, or both. Furthermore, the processor 102 and other related items in FIG. 1 may be a single contained processing module or may be incorporated wholly or partially within any of the other elements within the electronic device 100. The processor 102 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 102 may include one or more application processors, one or more baseband processors, or both, and perform the various functions described herein.

In the electronic device 100 of FIG. 1, the processor 102 may be operably coupled with a memory 104 and a nonvolatile storage 106 to perform various algorithms. For example, the storage 106 may store a productivity application 110 that includes one or more computer-readable instructions that cause the processor 102 to perform at least a portion of the automatic flowchart functions discussed herein. The productivity application 110 may include, for example, a spreadsheet application, a word processing application, an electronic slide presentation application, an online collaboration application, etc. The automatic flowchart functions may include entering a flowchart mode within the productivity application 110 that enables the automatic flowchart functionalities described herein. In some embodiments, when in a flowchart mode, a productivity application may provide flow nodes (e.g., in lieu of traditional re-sizing/re-positioning nodes that may be disposed upon one or more objects when not in flowchart mode). The flow nodes may be expanded to create flowchart flow lines independent of user-selection of a line or other object insertion input. In some embodiments, the automatic flowchart functions may include an automatic flowchart object generation feature that automatically generates flowchart objects (e.g., shapes) independent of selection of a traditional object insertion input of the productivity application. In some embodiments, automatic object formatting may also be performed (e.g., based upon identified object connections). In this manner, the automatic flowchart functionalities of the productivity application 110 may vastly improve flowchart creation and editing, by creating new efficiencies both in object and connection generation and object consistency.

Such programs or instructions executed by the processor 102 may be stored in any suitable article of manufacture that includes one or more tangible, computer-readable media. The tangible, computer-readable media may include the memory 104 and/or the nonvolatile storage 106, individually or collectively, to store the instructions or routines. The memory 104 and the nonvolatile storage 106 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 102 to enable the electronic device 100 to provide various functionalities.

In certain embodiments, the display 108 may facilitate users to view images generated on the electronic device 100. In some embodiments, the display 108 may include a touch screen, which may facilitate user interaction with a user interface of the electronic device 100. Furthermore, it should be appreciated that, in some embodiments, the display 108 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 112 of the electronic device 100 may enable a user to interact with the electronic device 100 (e.g., pressing a button to increase or decrease a volume level). The I/O interface 114 may enable electronic device 100 to interface with various other electronic devices, as may the network interface 116. In some embodiments, the I/O interface 114 may include an I/O port for a hardwired connection for charging and/or content manipulation using a standard connector and protocol, such as the Lightning connector, a universal serial bus (USB), or other similar connector and protocol. The network interface 116 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution® (LTE) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 116 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 116 of the electronic device 100 may allow communication over the aforementioned networks (e.g., 5G, Wi-Fi, LTE-LAA, and so forth).

The network interface 116 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 116 may include a transceiver 120. In some embodiments, all or portions of the transceiver 120 may be disposed within the processor 102. The transceiver 120 may support transmission and receipt of various wireless signals via one or more antennas, and thus may include a transmitter and a receiver. The power source 118 of the electronic device 100 may include any suitable source of power, such as a rechargeable lithium polymer (Li-poly) battery and/or an alternating current (AC) power converter.

Figure 2:
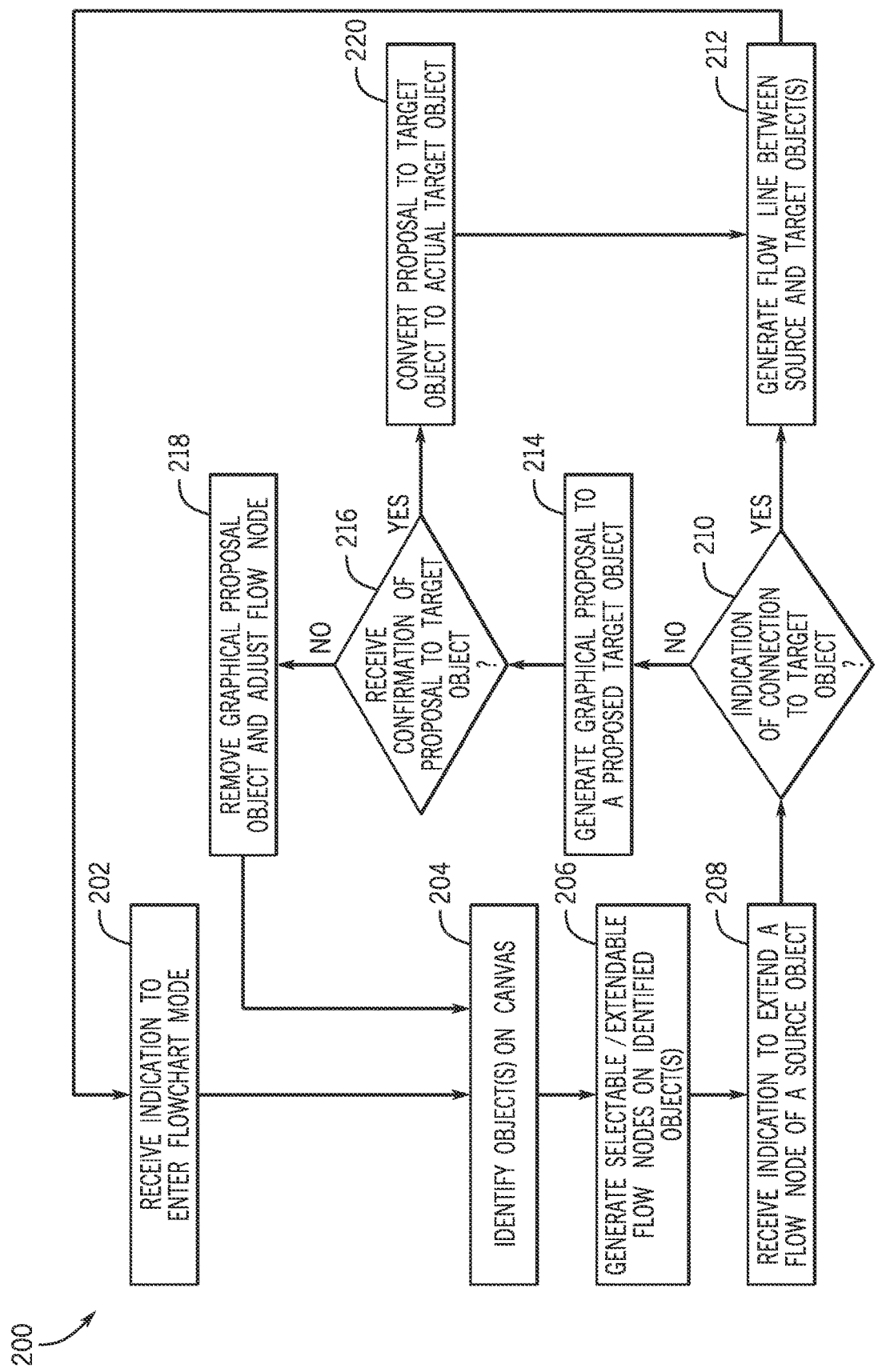
FIG. 2 is a flowchart, illustrating a process for implementing automatic flowchart functionalities, in accordance with one or more embodiments of the current application.
Figure 3:
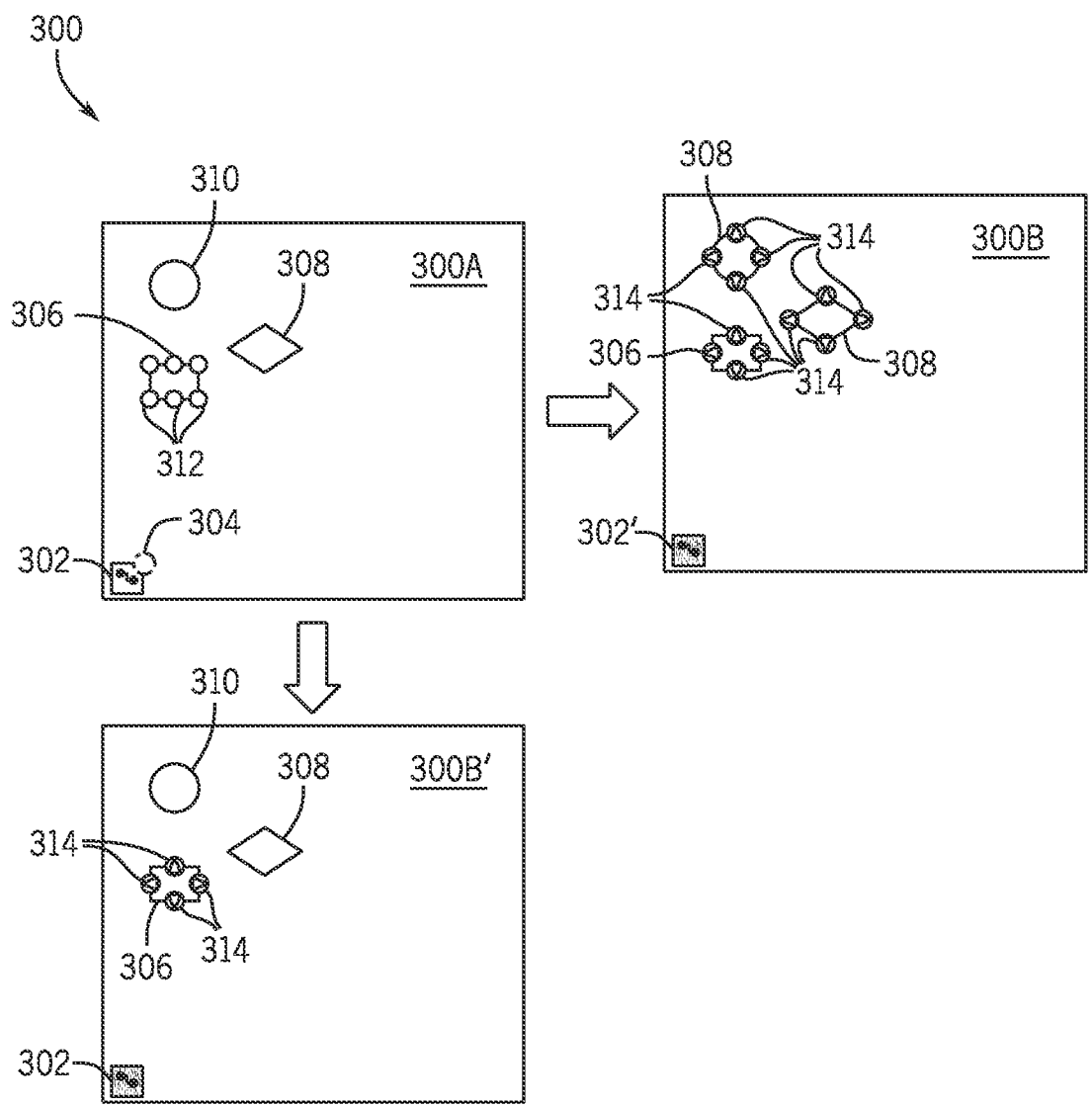
FIG. 3 is a schematic diagram, illustrating flow node generation and presentation within a productivity application, in accordance with one or more embodiments of the current application.

FIG. 2 is a flowchart, illustrating a process 200 for implementing automatic flowchart functionalities, in accordance with one or more embodiments of the current application. The process 200 begins by receiving an indication to enter flowchart mode (block 202). For example, in some embodiments, a selectable affordance may be provided within the productivity application 110 to enter flowchart mode. For example, FIG. 3 is a schematic diagram, illustrating a graphical user interface (GUI) progression 300 providing flow node generation and presentation within a productivity application upon selection of flowchart node affordance 302 via a user input (e.g., touch input 304), as illustrated in GUI progression pane 300A In other embodiments, when the flowchart mode is enabled by default and/or permanently, merely executing the productivity application 110 may provide the indication to enter flowchart mode.

In embodiments where selectable/expandable flow nodes are to be presented, one or more objects are identified on the canvas (e.g., graphical workspace of the productivity application 110) where the flow nodes may be presented (block 204). Selectable and/or extendable flow nodes are generated and presented on the identified objects (block 206).

In some embodiments, all objects within the canvas may be selected, while in other embodiments only selected objects may be identified. For example, in the GUI progression pane 300A, shape 306 is selected, while shapes 308 and 310 are not, as indicated by the selection nodes 312, which are affordances that, when selected, enable adjustment of size, shape, and/or position of the shape 306. In GUI progression panes 300B and 300B', flowchart mode is active, as illustrated by activated affordance 302'. In the embodiment of GUI progression pane 300B, all objects (e.g., shapes) within the canvas are identified and presented with flow nodes 314. In the embodiment of GUI progress pane 300B', only the selected objects (e.g., shape 306) are presented with the flow nodes 314.

Figure 4:
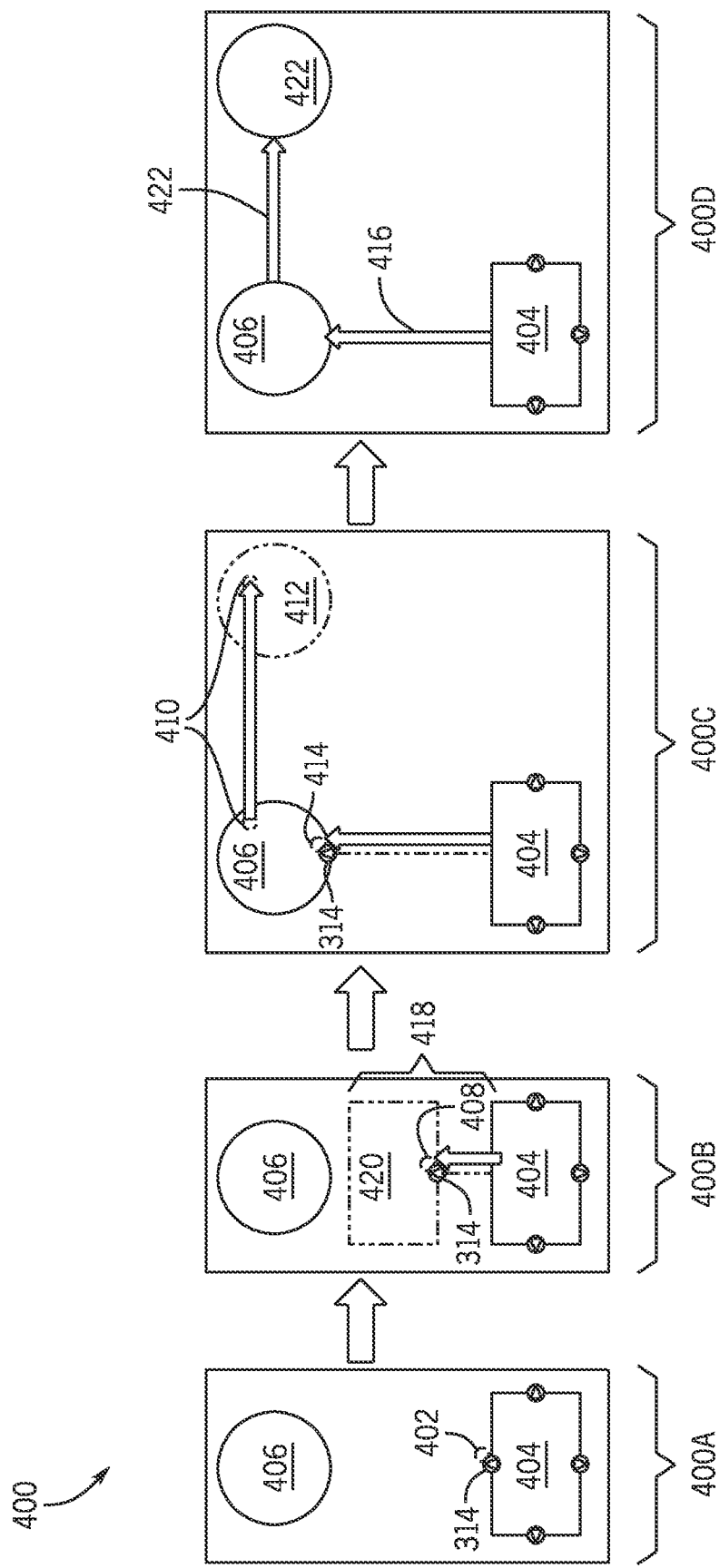
FIG. 4 is a schematic diagram illustrating flow node expansion causing proposal object and flow line generation, in accordance with one or more embodiments of the current application.

At block 208, an indication to extend a flow node of a source object is received. In some embodiments, this may be indicated via a user input tapping a particular one of the flow nodes, which may indicate to extend the flow node for a particular length (e.g., a pre-defined length and/or a until reaching another object). For illustration, FIG. 4 is a schematic diagram illustrating a GUI progression 400 of flow node expansion causing proposal object and flow line generation, in accordance with one or more embodiments of the current application. In FIG. 4, a tap 402 on a flow node 314 of shape 404, as illustrated in GUI progression frame 400A, may result in an indication to extend the flow node 404 (e.g., to a pre-determined length and/or until another object is reached (e.g., shape 406).

In some embodiments, this indication may be in response to a user input selecting and dragging a particular one of the flow nodes to a particular ending location. In GUI progression frame 400B a drag input 408 indicates to extend the flow node 314.

In some embodiments, this indication may be in response to selecting, dragging and holding an object for a threshold amount of time within the canvas, which may indicate to duplicate the dragged object and connect a flow line between the original object and the new duplicated object. In GUI progression frame 400C, the object drag and hold input 410 applied to object 406 indicates to extend a flow line from object 406 to a proposed duplicate object 412 of object 406 at the location where the hold occurs.

A determination is made as to whether the indication to extend the flow node indicates a connection to an existing target object (decision block 210). For example, in GUI progression frame 400B, the drag input 408 to an area without an object, indicates to extend the flow node 314 to an area without an existing target object. Further, in GUI progression frame 400C of FIG. 4, the continued drag input 414 from the drag input 408 of GUI progression frame 400B results in an indication to connect to shape 406 (e.g., an existing target shape).

When a connection to an existing target object is indicated at block 208, a flow line from the source object to the target object may be generated (block 212). In some embodiments, a graphical proposal of the connection may be presented (e.g., as dashed line, shaded line, etc.) until a confirmation is received (e.g., by removing the input). For example, the continued drag input 414, when confirmed, results in a flow line generated from shape 404 to shape 406.

When a connection to an existing target object is not indicated at block 208, a graphical proposal to a proposed target object may be generated (block 214). In some embodiments, the proposal may be generated after a threshold amount of non-movement in an input providing the extend indication, while in other embodiments, the proposals may be generated without respect to such a threshold. Returning to FIG. 4, a proposed connection 418 to a proposed target object 420 is presented (e.g., after the drag input 408 commences and/or after a period of non-movement during the drag input 408). The proposed target object 420 may include a duplicate object of the source object where the indication originated from (e.g., here shape 404, based upon the drag operation of a flow node 314 associated with/corresponding to the shape 404). In some embodiments, the proposed target object 420 may only share some attributes of the source object. For example, in such embodiments, the proposed target object 420 may retain the same shape, color, fill, font, font alignment, and size of the source object, but may not retain text of the source object.

A determination may be made as to whether confirmation of the proposed connection to the proposed target object is confirmed (decision block 216). In some embodiments, the confirmation may be an express input indicating the confirmation, while in other embodiments the confirmation may be a withdrawal of the input away from an original origin of the input (e.g., release of a drag operation in a new location). If not confirmed, the graphical proposal is withdrawn and the flow node 314 is adjusted in accordance with the input. For example, in the case of a continued drag input (e.g., continued drag input 414 of FIG. 4, where the flow node is ultimately connected to another object), the proposed target object is withdrawn from presentation and the flow node 314 is adjusted to a position of the other object (e.g., shape 406). In some embodiments, the input may indicate to return the flow node 314 to the source object (e.g., shape 404), in which case the flow node and the connector extending from the source object are retracted back to the source object.

When the confirmation is received at decision block 216, the proposed target object is converted to an actual target object (block 220) and a flow line between the source object and the target object is generated (block 212). For example, in FIG. 4, the drag and hold input 410 is released in GUI progression frame 400D, resulting in the proposed duplicate object 412 being converted into an actual target object 422. A flow line 424 is generated to connect the source object (e.g., shape 406) to the actual target object 422

Figure 5:
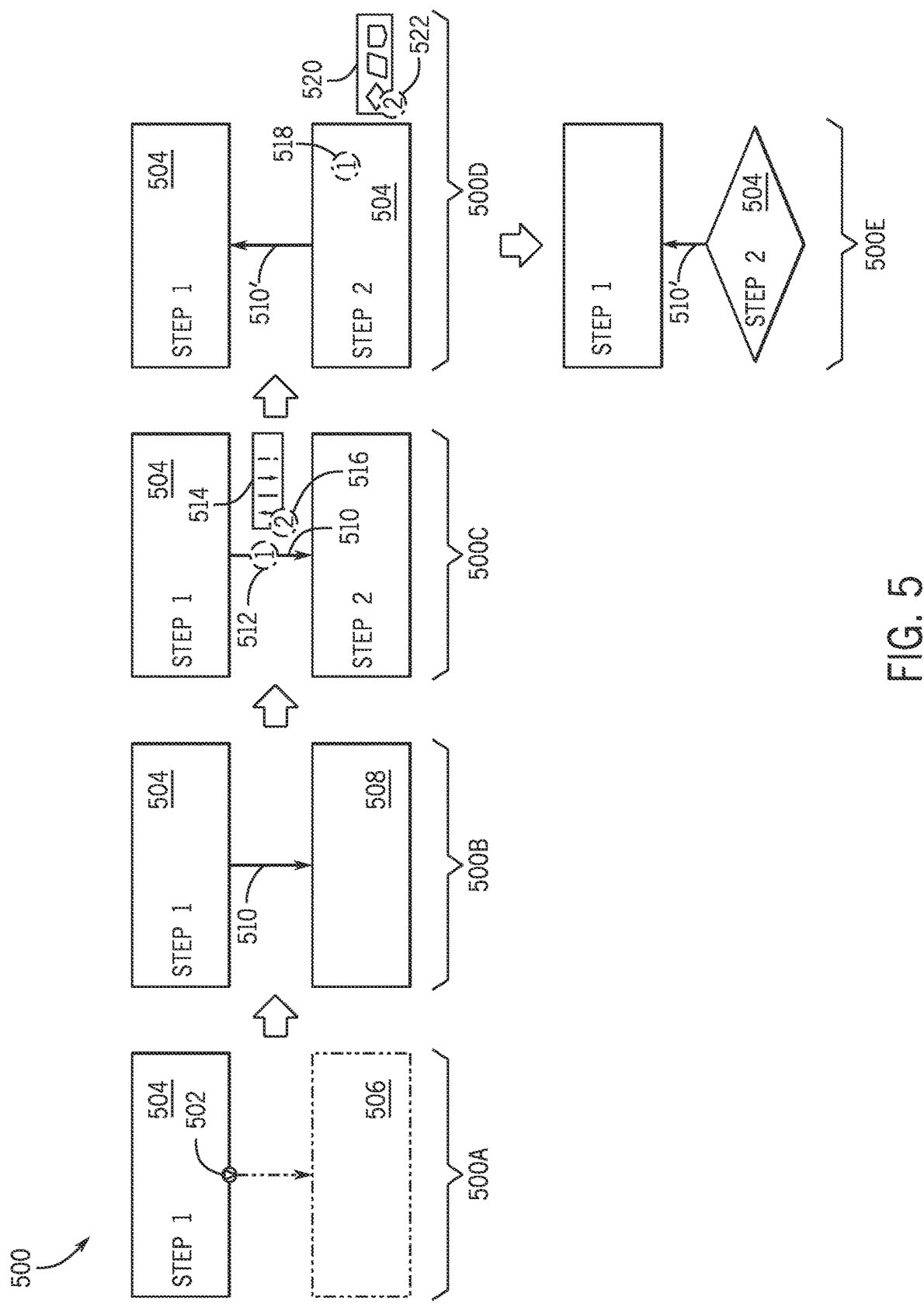
FIG. 5 is a schematic diagram of an example flowchart generation progression that illustrates certain flowchart generation and editing features, in accordance with one or more embodiments of the current application.

Turning now to a discussion of editing facilitated by the current automatic flowchart functionality, FIG. 5 is a schematic diagram of an example flowchart generation progression 500 that illustrates certain flowchart generation and editing features, in accordance with one or more embodiments of the current application. In the illustrated embodiment, in GUI progression frame 500A, a flow node 502 of a source object (e.g., shape 504) is dragged and released without a connection to an actual target object. This results in a proposed target object 506 being converted to an actual target object 508 with a flow line connection 510, as illustrated in GUI progression frame 500B.

In GUI progression frame 500C, a user input 512 (e.g., a touch and hold, selection, etc.) on the flow line 510 may indicate to edit the flow line 510. In response to the user input 512, a flow line edit menu 514 may be provided that provides affordances for changes to the flow line 510. For example, as indicated, a flow direction change may be edited, a flow line pattern may be edited, and/or other features, such as line weight, color, gradient, etc.) may be edited. In the depicted example, a second user input 516 indicates to change the flow direction of the flow line 510, resulting in a flow direction change, as indicated in the flow line 510' in GUI progression frame 500D.

Further, in GUI procession 500D, an object edit input 518 is provided with respect to actual target object 504, resulting in an object edit menu 520 being displayed. The object edit menu 520 may provide affordances for changing object characteristics of a corresponding object. For example, here the object edit menu 520 provides shape change objects, which may be cultivated from common flowchart shapes, commonly used shapes, etc. The object edit menu 520 may provide additional editing affordances, such as size, color, font, font alignment, outline customization, etc.

In the depicted example, a user input 522 indicates to change the shape of the actual target object to a decision diamond. Accordingly, in GUI progression frame 500E, the shape of the actual target object 504 is changed to a decision diamond.

Figure 6:
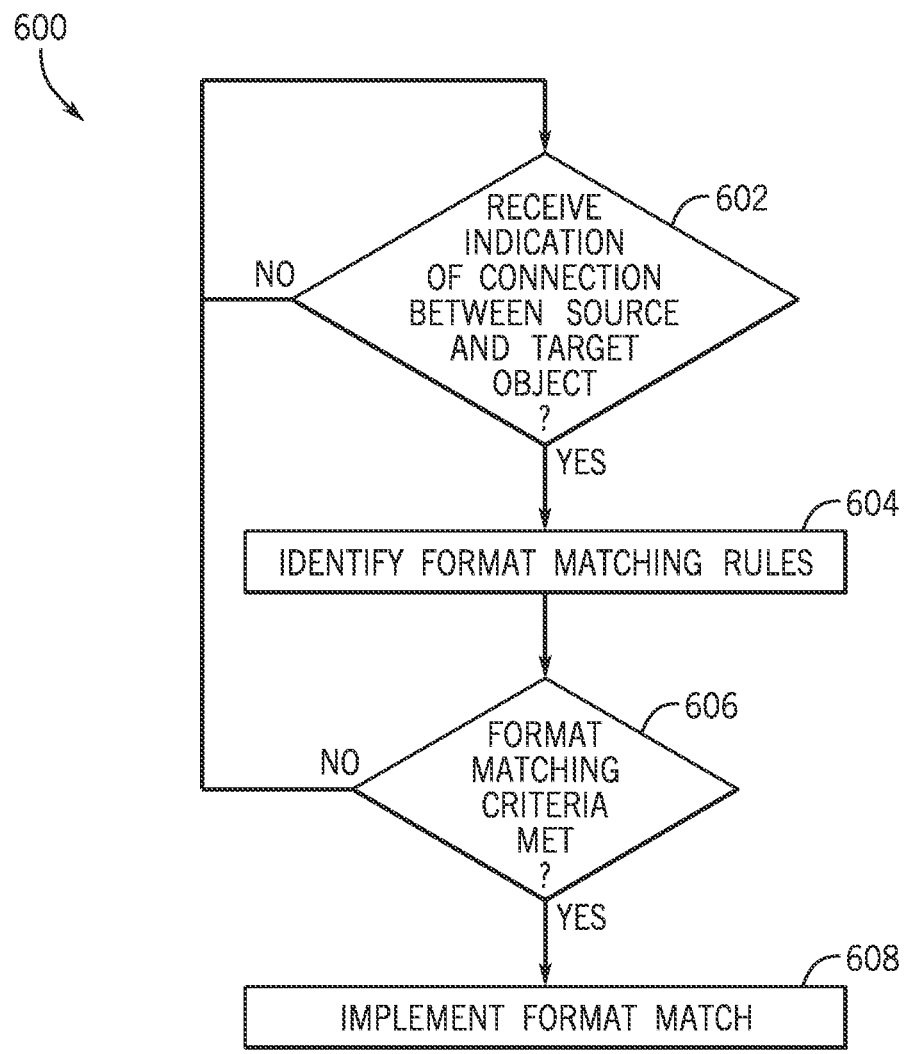
FIG. 6 is a flowchart, illustrating an automatic formatting process, in accordance with one or more embodiments of the current application.

Turning now to automatic formatting of flowchart objects and flow lines, FIG. 6 is a flowchart, illustrating an automatic formatting process 600, in accordance with one or more embodiments of the current application. At decision block 602, a determination is made as to whether a connection (e.g., flow line connection) between a source and target object is received. If not, the process 600 may continue until such a connection is received.

In response to receiving an indication of a connection between a source and target object, format matching rules may be identified (block 604). The format matching rules may provide an indication of when to match formatting between a target object and a source object (e.g., by imposing at least a subset of the formatting of the source object on the target object or vis-a-versa). For example, the format matching rules may dictate that certain formatting is not carried over between objects, certain formatting is always carried over between objects, and/or certain formatting is carried over when certain criteria is met. The format matching rules may also specify whether the formatting should be carried over from the source object to the target object or from the target object to the source object.

Figure 7:
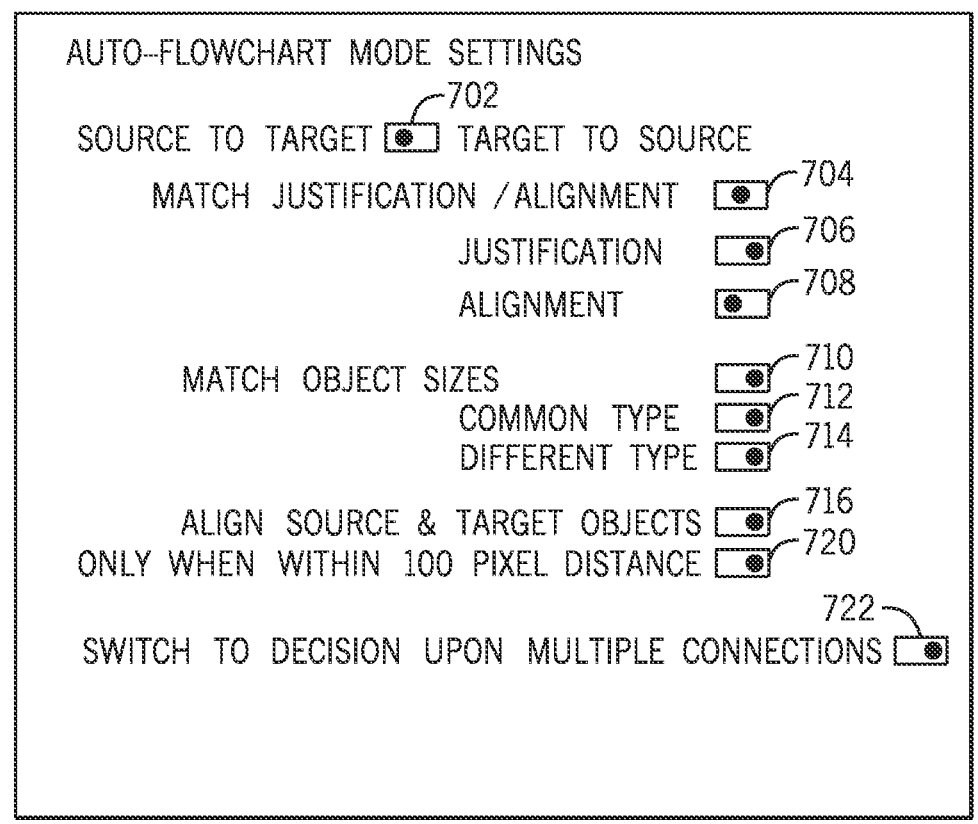
FIG. 7 is a schematic diagram, illustrating a graphical user interface (GUI) that provides an example of customizable features of the automatic flowchart functionality, in accordance with one or more embodiments of the current application.

In some embodiments, the format matching rules may be defined in a graphical user interface. FIG. 7 is a schematic diagram, illustrating a graphical user interface (GUI) 700 that provides an example of customizable features of the automatic flowchart functionality, in accordance with one or more embodiments of the current application. As illustrated in the GUI 700, a formatting source affordance 702 defining whether to source the formatting from the source object or the target object is provided (e.g., here set to sourcing the formatting from the source object to the target object). Further, an affordance 704 enables matching of justification (e.g., left, right, centered) and alignment (e.g., top, bottom, centered) between source and target objects, when set. Here, the affordance 704 is partially set, as justification affordance 706 is set, but alignment affordance 708, indicating that justification will be matched without additional criteria, and alignment will not be matched, regardless of any criteria. The GUI 700 also includes a global size matching affordance 710 that, when selected, causes matching of sizes of objects both of common types and different types. A common type size matching affordance 712, when selected, matches sizes only when the source and target objects are of a common type (e.g., common type of shape, both images, etc.) A different type size matching affordance 714, when selected, matches sizes when the source object and the target object are different types (e.g., different shapes and/or one shape and one image).

An align objects affordance 716, when selected, aligns positions of the source object and the target object. An optional criteria affordance 720 may set criteria for a particular format matching rule. Here, for example, the criteria affordance 720, when selected, sets a threshold amount of difference in position that may be observed to implement the format matching (e.g. target object and source object alignment).

A determination is made as to whether the format matching criteria is met (decision block 606). When particular formatting items include different criterial this determination as subsequent conditioned implementation may be performed for each formatting item. If the format matching criteria is not met, no carry over of format between the objects is implemented. However, when the format matching criteria is met, the format matching is implemented (block 608), by carrying over formatting between the source and target objects, in accordance with the format matching rules. The GUI 700 also includes an automatic shape update affordance 722 that, when selected, automatically updates a source object from an original shape to a decision diamond when multiple flow connections flow out of the source object. Other format matching rules and/or criteria may be provided and the example provided in the GUI 700 is not intended as an exhaustive list. Indeed, items such as font matching, color matching, etc. may also be provided.

Figure 8:
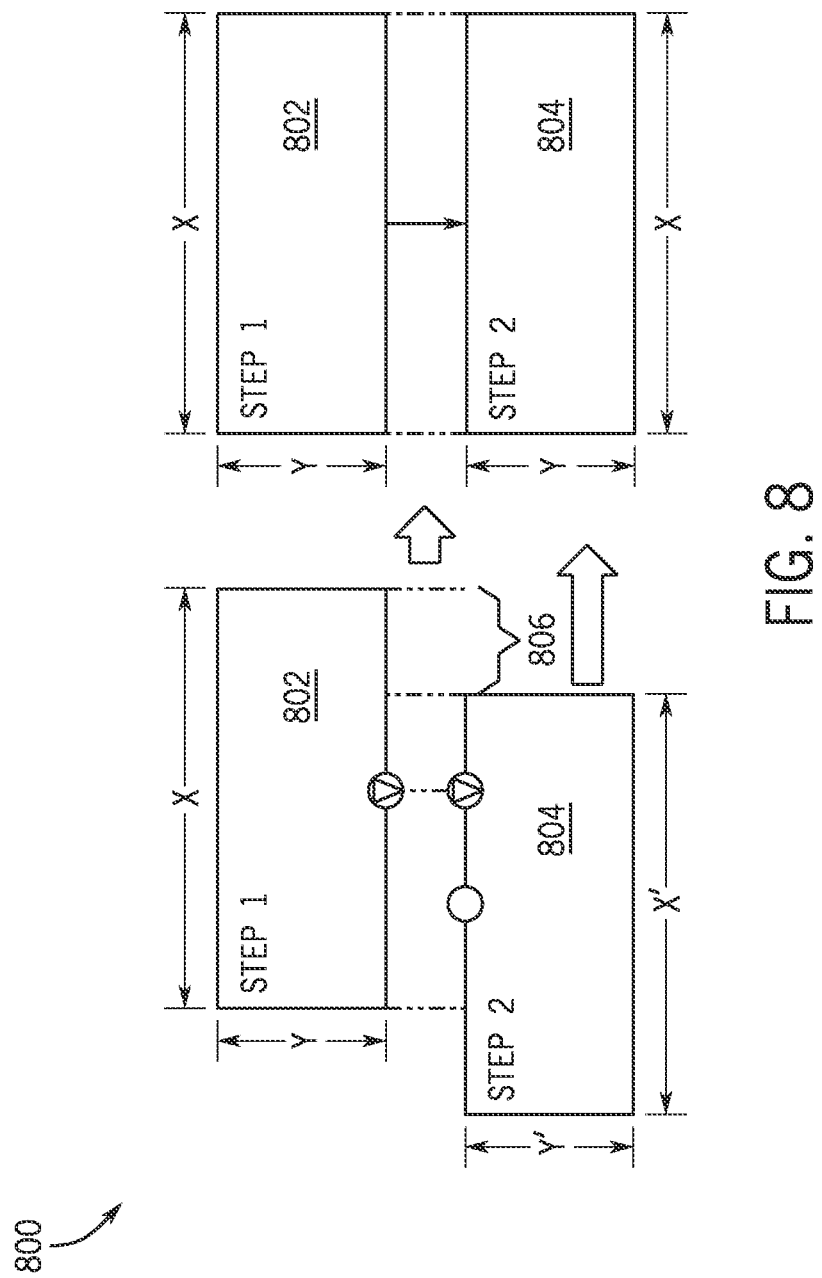
FIGS. 8-10 are schematic diagrams of graphical elements of the productivity application that are automatically formatted, in accordance with one or more embodiments of the current application.
Figure 10:
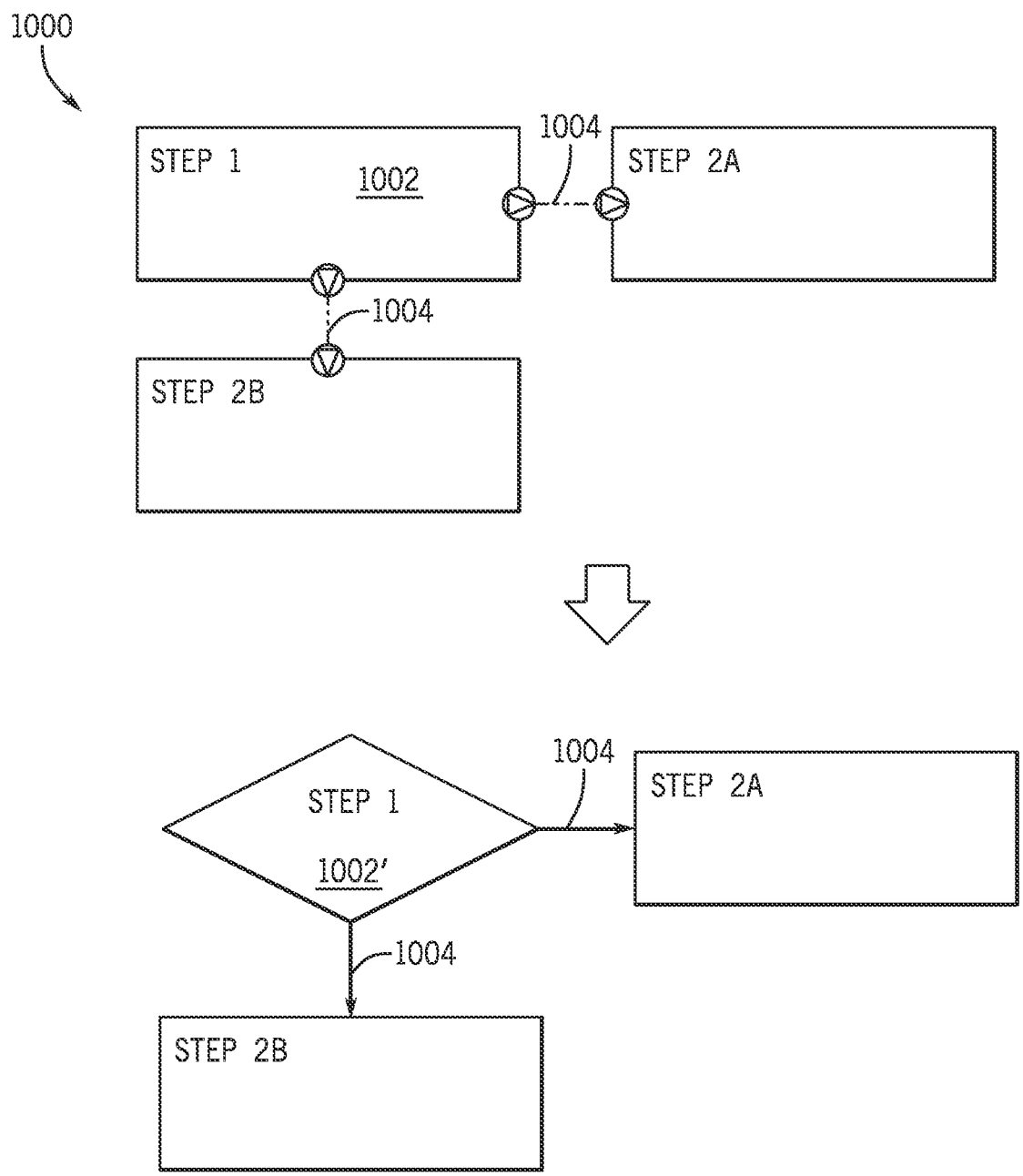

FIGS. 8 10 are schematic diagrams of GUI progressions 800, 900, and 100, respectively, depicting implementation of the format matching rules defined in the GUI 700, in accordance with one or more embodiments of the current application. Starting first with FIG. 8, implementation of size matching, object alignment, and text justification and text alignment rules are illustrated. In response to identifying a flow connection between source object 802 and a target object 804, source to target format matching is implemented in accordance with affordance 702. Further, because the source object 802 and target object 802 have a common object type and common type size matching affordance 714 is set, the size (as indicated by dimensions x' and y') of target object 804 is adjusted to match the size of the source object 802 (as indicated by dimensions x and y). Further, because the skew in alignment may be less than the threshold of 100 pixels set by the optional criteria affordance 720, the target object 804 is automatically aligned to source object 802. Additionally, as illustrated, the text "Step 1" of the Source Object 802 is center justified and center aligned, whereas the text "Step 2" of the Target Object 804 prior to automatic format matching, is left-justified and upper-aligned. Based upon the justification affordance 706 being set and the alignment affordance 708, not being set, the text "Step 2" of the Target Object 804 after automatic format matching, is changed to center-justified, but is refrained from changing to center-alignment, in accordance with the format matching rules defined in GUI 700.

Figure 9:
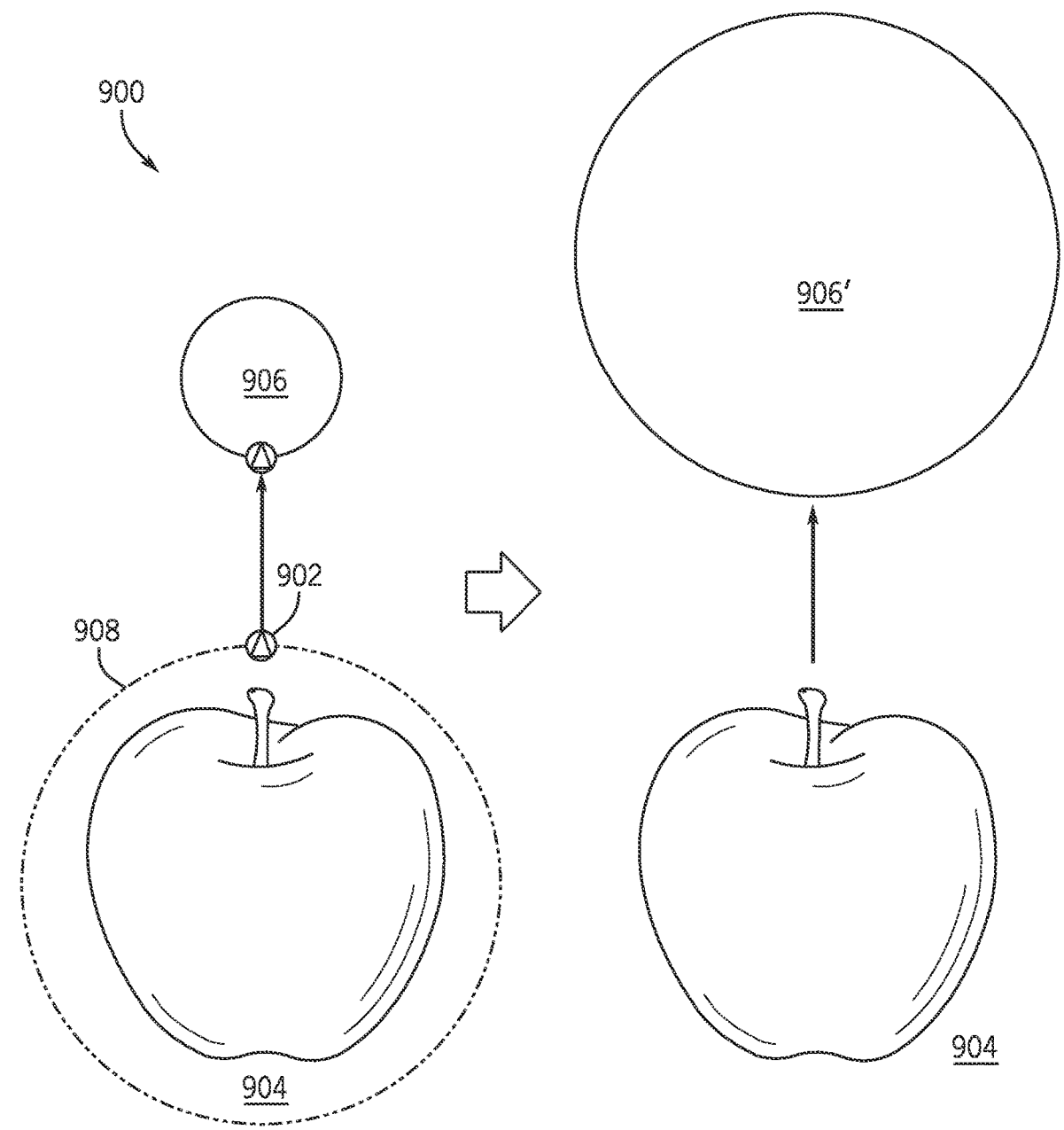

Turning now to the example depicted in FIG. 9, FIG. 9 illustrates implementation of format matching across object types. In FIG. 9, a flow node 902 associated with a source object 904 (here, an image of an apple) is dragged to a target object 906 (e.g., here an oval shape). Based upon different type size matching affordance 714 being set, the target object 906 may adjust to target object 906' having a size that matches an identified shape perimeter 908 of the source object 904. For calculation simplicity, in some embodiments, the shape perimeter 908 may be identified as a common shape as the target object 906, sized to wholly and/or substantially encompass the source object 904. In this manner, the adjustment of the target object 906 may be derived easily from the shape perimeter 908, by merely adjusting the target object 906 size to the size of the shape perimeter 908.

FIG. 10 illustrates the automatic shape adjustment to be implemented when affordance 722 is set. As mentioned above, the affordance 722, when set, results in the source object being adjusted to a decision diamond when two or more flow connections are identified from the source object. In FIG. 10, a source object 1002 includes two flow connections 1004. In response to the affordance 722 being set and the criteria (e.g., two or more flow connections) being met, an automatic adjustment is performed to change the shape of the source object 1002 to a source object 1002' having a decision diamond shape. The flow connections 1004 are preserved, resulting in automatic decisioning within the generated flowchart.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A tangible, non-transitory, computer-readable medium, comprising computer-readable instructions that when executed by one or more processors of one or more computers, cause the one or more computers to:
    present a graphical user interface (GUI) comprising a work canvas and a first object;
    receive an indication to extend a flow connection from the first object to a second object, independent of selection via a connection insertion tool of the GUI;
    in response to receiving the indication:
        generate, in the GUI, the flow connection between the first object and the second object; and
        modify one or more characteristics of the first object to match one of more characteristics of the second object by carrying over the one or more characteristics from the second object to the first object; or modify the one or more characteristics of the second object to match the one of more characteristics of the first object by carrying over the one or more characteristics from the first object to the second object.

2. The tangible, non-transitory, computer-readable medium of claim 1, comprising computer-readable instruction that, when executed by the one or more processors of the one or more computers, cause the one or more computers to:
    render, in the GUI, a flow connection node associated with the first object, wherein an interaction with the flow connection node via the GUI is configured to provide the indication to extend the flow connection from the first object to the second object.

3. The tangible, non-transitory, computer-readable medium of claim 2, wherein the interaction comprises a drag of the flow connection node from the first object to the second object.

4. The tangible, non-transitory, computer-readable medium of claim 2, wherein the interaction comprises a drag of the flow connection node from the first object to a first portion of the work canvas not containing an object, wherein the computer-readable medium comprises computer-readable instruction that, when executed by the one or more processors of the one or more computers, cause the one or more computers to:
    render, in the GUI, a proposed target object at the first portion of the work canvas;
    convert the proposed target object to the second object; and
    generate the flow connection between the first object and the second object after converting the proposed target object to the second object.

5. The tangible, non-transitory, computer-readable medium of claim 4, comprising computer-readable instruction that, when executed by the one or more processors of the one or more computers, cause the one or more computers to:
    receive an indication to confirm the proposed target object; and
    convert the proposed target object to the second object only after receiving the indication to confirm the proposed target object.

6. The tangible, non-transitory, computer-readable medium of claim 4, comprising computer-readable instruction that, when executed by the one or more processors of the one or more computers, cause the one or more computers to:
    receive an indication declining the proposed target object; and
    in response to receiving the indication declining the proposed target object:
        withdraw rendering, in the GUI, of the proposed target object; and
        refrain from converting the proposed target object to the second object.

7. The tangible, non-transitory, computer-readable medium of claim 2, comprising computer-readable instruction that, when executed by the one or more processors of the one or more computers, cause the one or more computers to:
    receive an indication to enter a flowchart mode of the GUI; and
    in response to receiving the indication to enter the flowchart mode of the GUI, render, in the GUI, the flow connection node.

8. The tangible, non-transitory, computer-readable medium of claim 7, comprising computer-readable instruction that, when executed by the one or more processors of the one or more computers, cause the one or more computers to:
    identify a plurality of objects on the work canvas; and
    in response to receiving the indication to enter the flowchart mode of the GUI, render, in the GUI, at least one flow connection node on each of the plurality of objects on the work canvas.

9. The tangible, non-transitory, computer-readable medium of claim 7, comprising computer-readable instruction that, when executed by the one or more processors of the one or more computers, cause the one or more computers to:
    identify a user-selected subset of a plurality of objects on the work canvas; and
    in response to receiving the indication to enter the flowchart mode of the GUI, render, in the GUI, at least one flow connection node on each of the user-selected subset of the plurality of objects on the work canvas.

10. The tangible, non-transitory, computer-readable medium of claim 1, wherein the indication comprises a drag and temporary hold of the first object in new portion of the work canvas not containing an object, wherein the computer-readable medium comprises computer-readable instruction that, when executed by the one or more processors of the one or more computers, cause the one or more computers to:
    generate and render, in the GUI, the second object at the new portion of the work canvas, the second object comprising a duplication of at least a portion of characteristics of the first object; and
    generate the flow connection between the first object and the second object after generating the second object.

11. The tangible, non-transitory, computer-readable medium of claim 1, comprising computer-readable instruction that, when executed by the one or more processors of the one or more computers, cause the one or more computers to:
  receive an indication to edit the flow connection from the first object to the second object; and
  in response to receiving the indication to edit the flow connection, render, in the GUI, a flow connection editing menu comprising one or more affordances for changing one or more characteristics of the flow connection from the first object to the second object.

12. The tangible, non-transitory, computer-readable medium of claim 1, comprising computer-readable instruction that, when executed by the one or more processors of the one or more computers, cause the one or more computers to:
  receive an indication to edit the first object, the second object or both; and
  in response to receiving the indication to edit the first object, the second object, or both, render, in the GUI, an object editing menu comprising one or more affordances for changing one or more characteristics of the first object, the second object, or both.

13. The tangible, non-transitory, computer-readable medium of claim 1, comprising computer-readable instruction that, when executed by the one or more processors of the one or more computers, cause the one or more computers to:
  in response to the generation of the flow connection between the first object and the second object:
    identify format matching rules between the first object and the second object;
    determine whether format matching criteria of the format matching rules is met; and
    in response to the format matching criteria being met, implement the format matching rules, by applying at least a portion of formatting of one of the first object or the second object to the other of the first object or the second object.

14. The tangible, non-transitory, computer-readable medium of claim 13, wherein the format matching rules comprise an indication of which of the first object or the second object provide the at least portion of formatting to be matched in the other of the first object or the second object.

15. The tangible, non-transitory, computer-readable medium of claim 13, wherein the format matching rules comprise an indication of the at least portion of formatting, the at least portion of formatting comprising one or more of: text alignment, text justification, object sizing, or object alignment.

16. The tangible, non-transitory, computer-readable medium of claim 13, wherein the format matching rules comprise an indication to adjust an object shape of the first object to a decision diamond when the first object comprises two or more flow connections; wherein the computer-readable medium comprises computer-readable instruction that, when executed by the one or more processors of the one or more computers, cause the one or more computers to:
  identify that the first object comprises two or more flow connections; and
  in response to identifying that the first object comprises two or more flow connections, modify a shape of the first object to a decision diamond.

17. The tangible, non-transitory, computer-readable medium of claim 13, wherein the format matching rules comprise an indication to adjust objects of different types; wherein the computer-readable medium comprises computer-readable instruction that, when executed by the one or more processors of the one or more computers, cause the one or more computers to:
  match a size between the first object and the second object, wherein one of the first object and the second object is an image and the other of the first object and the second object is a shape, by:
    defining a shape perimeter around the image that matches the shape; and
    setting the size based upon the shape perimeter.

18. A computer-implemented method, comprising:
  presenting a graphical user interface (GUI) comprising a work canvas and a first object;
  rendering, in the GUI, a flow connection node associated with the first object, wherein an interaction with the flow connection node via the GUI is configured to provide an indication to extend a flow connection from the first object;
  receiving an interaction input indicating a movement of the flow connection node from the first object to a second object;
  in response to receiving the interaction input, generating, in the GUI, a flow connection between the first object and the second object, independent of selection of a connection insertion tool of the GUI; and
  modifying one or more characteristics of the first object to match one of more characteristics of the second object by carrying over the one or more characteristics from the second object to the first object; or modifying the one or more characteristics of the second object to match the one of more characteristics of the first object by carrying over the one or more characteristics from the first object to the second object.

19. A system, comprising:
  memory; and
  one or more processors configured to host a cloud-based productivity application, the cloud-based productivity application configured to:
    cause a presentation, at a client computer, of a graphical user interface (GUI) comprising a work canvas and a first object;
    receive, via the client computer, an indication to extend a flow connection from the first object to a second object independent of selection via a connection insertion tool of the GUI; and
    in response to receiving the indication, cause generation, in the GUI, the flow connection between the first object and the second object; and
    modify one or more characteristics of the first object to match one of more characteristics of the second object by carrying over the one or more characteristics from the second object to the first object; or modify the one or more characteristics of the second object to match the one of more characteristics of the first object by carrying over the one or more characteristics from the first object to the second object.

20. The system of claim 19, wherein the indication comprises:
  a drag of a flow connection node corresponding to the first object rendered in the GUI from the first object to the second object, rendered on the work canvas;
  a drag of the flow connection node from the first object to a first portion of the work canvas not containing an object, wherein the cloud-based productivity application is configured to:

cause rendering, in the GUI, a proposed target object at the first portion of the work canvas;
convert the proposed target object to the second object; and
generate the flow connection between the first object and the second object after converting the proposed target object to the second object;
a drag and temporary hold of the first object to the first portion of the work canvas, wherein the cloud-based productivity application is configured to:
generate and cause rendering, in the GUI, the second object at the first portion of the work canvas, the second object comprising a duplication of at least a portion of characteristics of the first object; and
generate the flow connection between the first object and the second object after generating the second object; or
any combination thereof.

* * * * *